UNITED STATES PATENT OFFICE.

ADELBERT MYLINS, OF BASLE, SWITZERLAND, ASSIGNOR TO JEAN ROD GEIGY, OF SAME PLACE.

PRODUCTION OF A NEW RED AZO COLOR.

SPECIFICATION forming part of Letters Patent No. 376,392, dated January 10, 1888.

Application filed August 13, 1887. Serial No. 246,846. (Specimens.)

*To all whom it may concern:*

Be it known that I, ADELBERT MYLINS, of Basle, Switzerland, have invented a certain new and useful Process for the Production of a Red Azo Color, of which the following is a specification.

The said invention has for its object the production of a new red azo color. Paradiazonitro-benzol acting upon α(alpha) naphthylamine disulphonate of sodium forms, as I have discovered, a red color.

In order to carry out my invention I dissolve, for instance, thirteen thousand eight hundred kilos of nitro-aniline in water acidulated with sulphuric acid and diazotise by addition of seven kilos of nitrate of sodium. This is poured, while stirring, into the solution of thirty-five kilos of α (alpha) naphthylamine disulphonate of sodium. The coloring-matter is then filtered, saturated with carbonate of sodium, and dried.

The following formula will clearly demonstrate my invention:

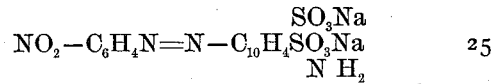

Having thus described my invention, what I claim as new, and desire to secure by Letters Patent, is—

In a process for the production of a new red azo color, first mixing nitro-aniline with water acidulated with sulphuric acid, then diazotising by adding nitrate of sodium, mixing therewith while being agitated α (alpha) naphthylamine disulphonate of sodium, then filtering and saturating with carbonate of sodium, and drying, substantially as described.

In testimony whereof I hereunto sign my name, in the presence of two subscribing witnesses, this 8th day of July, 1887.

ADELBERT MYLINS.

Witnesses:
GEORGE GIFFORD,
CHS. A. RICHTER.